US010789971B2

(12) United States Patent
Santos

(10) Patent No.: US 10,789,971 B2
(45) Date of Patent: Sep. 29, 2020

(54) DEVICE AND METHOD FOR PREVENTING INTELLIGIBLE VOICE RECORDINGS

(71) Applicant: SECURITE SPYTRONIC INC., Montréal-Nord (CA)

(72) Inventor: Alexandre Santos, Montréal-Nord (CA)

(73) Assignee: SECURITE SPYTRONIC INC., Montreal, Québec (CA)

( * ) Notice: Subject to any disclaimer, the term of this patent is extended or adjusted under 35 U.S.C. 154(b) by 143 days.

(21) Appl. No.: 16/099,145

(22) PCT Filed: May 5, 2017

(86) PCT No.: PCT/CA2017/000118
§ 371 (c)(1),
(2) Date: Nov. 5, 2018

(87) PCT Pub. No.: WO2017/190221
PCT Pub. Date: Nov. 9, 2017

(65) Prior Publication Data

US 2019/0147902 A1 May 16, 2019

Related U.S. Application Data

(60) Provisional application No. 62/332,430, filed on May 5, 2016.

(51) Int. Cl.
*G06F 15/00* (2006.01)
*G10L 21/16* (2013.01)
*H04K 1/06* (2006.01)
*H04K 1/04* (2006.01)
*H04K 3/00* (2006.01)
*G10L 25/00* (2013.01)

(52) U.S. Cl.
CPC ................ *G10L 21/16* (2013.01); *H04K 1/04* (2013.01); *H04K 1/06* (2013.01); *H04K 3/82* (2013.01); *H04K 3/825* (2013.01); *H04K 2203/12* (2013.01); *H04K 2203/34* (2013.01)

(58) Field of Classification Search
CPC ..... E04B 9/22; E04B 9/04; E04B 9/10; E04B 9/14
USPC ........................................................ 704/200
See application file for complete search history.

(56) References Cited

U.S. PATENT DOCUMENTS

2004/0019479 A1 * 1/2004 Hillis .................. G10K 11/175 704/200.1

* cited by examiner

*Primary Examiner* — Thierry L Pham
(74) *Attorney, Agent, or Firm* — Praxis

(57) ABSTRACT

A method, device, system and kit for preventing the intelligible voice recording Is provided. The voice of a subject or Interlocutor Is recorded for a given time Interval thereby providing a voice recording. The voice recording Is cut Into shorter time interval segments thereby providing a set of voice recording segments. The set of voice recording segments is mixed in a randomly rearranged order, The mixed set of voice recording segments is spliced into a single randomly mixed voice recording. Emitting the randomly mixed voice recording during speaking of the subject or interlocutor prevents the Intelligible recording of the voice of the subject or interlocutor.

8 Claims, 2 Drawing Sheets

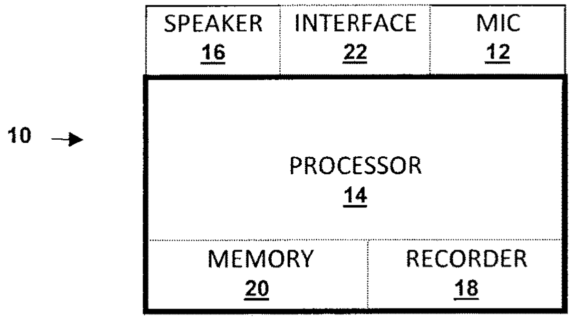
FIG. 1
FIG. 2: First Voice Recording
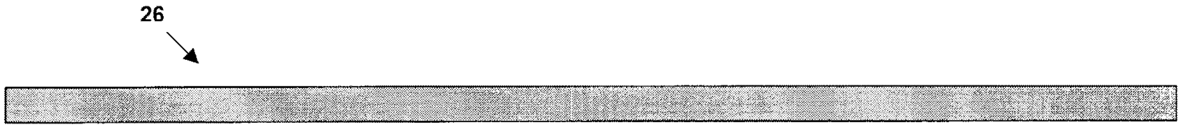
FIG. 3: Second Voice Recording
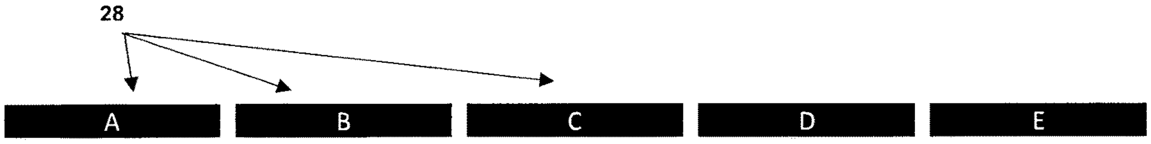
FIG. 4: First Set of Voice Recording Segments
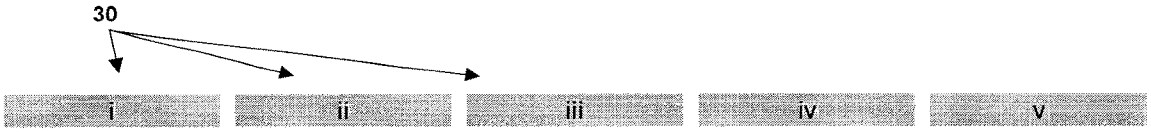
FIG. 5: Second Set of Voice Recording Segments
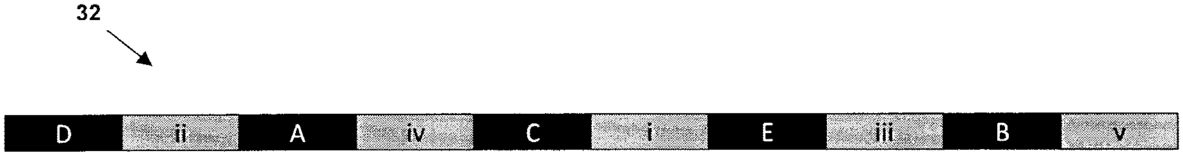
FIG. 6: Spliced Audio Recording of Randomly Mixed Voice Recording Segments

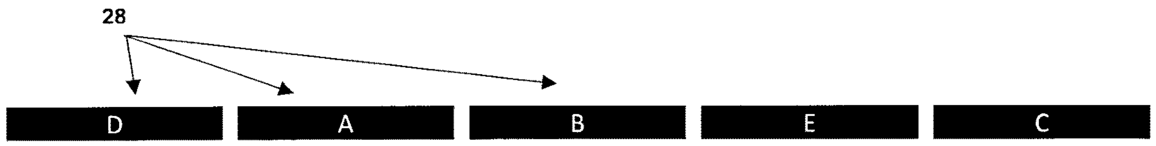
FIG. 7: Randomly Mixed Voice Recording Segments
FIG. 8: Spliced Audio Recording of Randomly Mixed Voice Recording Segments
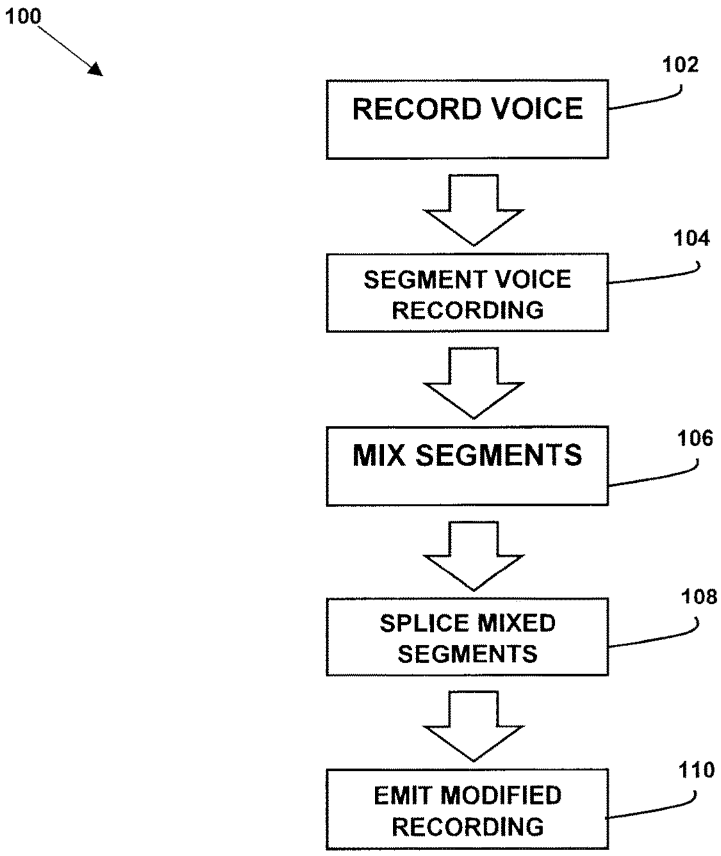
FIG. 9

DEVICE AND METHOD FOR PREVENTING INTELLIGIBLE VOICE RECORDINGS

CROSS-REFERENCE TO RELATED APPLICATIONS

The present application claims priority on U.S. Provisional Patent Application No. 62/332,430 filed on May 5, 2016.

TECHNICAL FIELD

The present disclosure relates to counter-surveillance. More particularly, but not exclusively, the present disclosure relates to jamming voice recording or bugging devices. More specifically and still not exclusively, the present disclosure relates to devices, methods, systems and kits for preventing intelligible voice recordings.

BACKGROUND

Voice recording jammers or audio jammers otherwise known as audio blockers are devices that protect sensitive or confidential conversations in a room from being recorded by an analog or digital recording device such as covert listening devices, bugs, wires and the like. The generally accepted standard range of audible frequencies for humans is 20 Hz to 20 KHz, although the range of frequencies individuals hear is greatly influenced by environmental factors. Ultrasonic sound or ultrasound refers to anything above the frequencies of audible sound, and nominally includes anything over 20 KHz. Infrasound is sound that is lower in frequency than 20 Hz, beneath the limit of human hearing. Various audio jammers can generate frequencies that fall into the normal range, the ultrasonic range and/or the infrasound range.

Audio jammers can generate white noise to distort the voice recording or suppresses the operation of the recorders by radiating noise interference. Most conventional devices suppress audio recording by generating a noise or a speech-similar audible as the interlocutors speak which interferes with the recording of the interlocutors' voice.

Ultrasonic jammers create an inaudible powerful barrier to the microphones in voice recorders including smartphones preventing them from properly recording as the interference from the ultrasonic frequency turns the conversation into unintelligible noise.

OBJECTS

It is an object of the present disclosure to provide a method for preventing an intelligible voice recording.

It is an object of the present disclosure to provide a device for preventing an intelligible voice recording.

It is an object of the present disclosure to provide a system for preventing an intelligible voice recording.

It is an object of the present disclosure to provide a kit for preventing an intelligible voice recording.

SUMMARY

In accordance with an aspect of the present disclosure, there is provided a method for preventing the intelligible recording of a voice, the method comprising: recording the voice of a subject for a given time interval thereby providing a voice recording; segmenting the voice recording into shorter time interval segments thereby providing a set of voice recording segments; mixing the order of the voice recording segments of the set in a randomly rearranged order; splicing the mixed set of voice recording segments into a single randomly mixed voice recording; and emitting the randomly mixed voice recording when the subject speaks thereby preventing the intelligible recording of the subject's voice.

In accordance with an aspect of the present disclosure, there is provided a method for preventing the intelligible recording of a conversation between at least two interlocutors, the method comprising: recording the voice of one of the at least two interlocutors for a given time interval thereby providing a first voice recording; recording the voice of the other of the at least two interlocutors for a given time interval thereby providing a second voice recording; segmenting each of the first and second voice recordings into respective shorter time interval segments thereby providing respective first and second sets of voice recording segments; mixing the first and second sets of voice recording segments together in a randomly rearranged order; splicing the mixed sets of voice recording segments into a single randomly mixed voice recording; and emitting the randomly mixed voice recording during the conversation of the at least two interlocutors thereby preventing the intelligible recording of the conversation.

In accordance with an aspect of the present disclosure, there is provided a device for preventing the intelligible recording the intelligible recording of a voice, the device comprising: a microphone; a processor in operational communication with the microphone being configured for implementing the steps of: recording the voice of a subject via the microphone for a given time interval thereby providing a voice recording; segmenting the voice recording into shorter time interval segments thereby providing a set of voice recording segments; mixing the order of the voice recording segments of the set in a randomly rearranged order; and splicing the mixed set of voice recording segments into a single randomly mixed voice recording; and a speaker in operational communication with the processor for emitting the randomly mixed voice recording, wherein emitting the randomly mixed voice recording during the subject's speaking prevents the intelligible recording of the subject's voice.

In accordance with an aspect of the present disclosure, there is provided a device for preventing the intelligible recording of a conversation between at least two interlocutors, the device comprising: a microphone; a processor in operational communication with the microphone being configured for implementing the steps of: separately recording each of the voices of the at least two interlocutors via the microphone for a respective given time interval thereby providing a first voice recording for one of the at least two interlocutors and a second voice recording for the other of the at least two interlocutors; segmenting each of the first and second voice recordings into respective shorter time interval segments thereby providing respective first and second sets of voice recording segments;

mixing the first and second sets of voice recording segments together in a randomly rearranged order; and splicing the mixed sets of voice recording segments into a single randomly mixed voice recording; and a speaker in operational communication with the processor for emitting the randomly mixed voice recording, wherein emitting the randomly mixed voice recording during the conversation of the at least two interlocutors prevents the intelligible recording of the conversation.

In accordance with an aspect of the present disclosure, there is provided a device for preventing the intelligible recording of a voice, the device comprising: a microphone; a recorder in operational communication with the microphone for recording the voice of a subject via the microphone for a given time interval thereby providing a voice recording; a processor in operational communication with the recording device and being configured for segmenting the voice recordings into shorter time interval segments thereby providing a set of voice recording segments, mixing the order of the voice recording segments of the set in a randomly rearranged order, and splicing the mixed set of voice recording segments into a single randomly mixed voice recording; and a speaker in operational communication with the processor for emitting the randomly mixed voice recording, wherein emitting the randomly mixed voice recording during the subject's speaking prevents the intelligible recording of the subject's voice.

In accordance with an aspect of the present disclosure, there is provided a device for preventing the intelligible recording of a conversation between at least two interlocutors, the device comprising: a microphone; a recorder in operational communication with the microphone for separately recording each of the voices of the at least two interlocutors via the microphone for a respective given time interval thereby providing a first voice recording for one of the at least two interlocutors and a second voice recording for the other of the at least two interlocutors; a processor in operational communication with the recording device and being configured for segmenting each of the first and second voice recordings into respective shorter time interval segments thereby providing respective first and second sets of voice recording segments, mixing the first and second sets of voice recording segments together in a randomly rearranged order, and splicing the mixed sets of voice recording segments into a single randomly mixed voice recording; and a speaker in operational communication with the processor for emitting the randomly mixed voice recording at an audible level, wherein emitting the randomly mixed voice recording during the conversation of the at least two interlocutors prevents the intelligible recording of the conversation.

In accordance with an aspect of the present disclosure, there is provided a system for preventing the intelligible recording of a of a voice, the system comprising: a microphone device; a recording device in operational communication with the microphone device for recording the voice of a subject via the microphone device for a given time interval thereby providing a t voice recording; a processing device in operational communication with the recording device and being configured for segmenting the voice recording into shorter time interval segments thereby providing a set of voice recording segments, mixing the order of the voice recording segments of the set in a randomly rearranged order, and splicing the mixed set of voice recording segments into a single randomly mixed voice recording; and a speaker device in operational communication with the processing device for emitting the randomly mixed voice recording, wherein emitting the randomly mixed voice recording during the subject's speaking prevents the intelligible recording of the subject's voice.

In accordance with an aspect of the present disclosure, there is provided a system for preventing the intelligible recording of a conversation between at least two interlocutors, the system comprising: a microphone device; a recording device in operational communication with the microphone device for separately recording each of the voices of the at least two interlocutors via the microphone device for a respective given time interval thereby providing a first voice recording for one of the at least two interlocutors and a second voice recording for the other of the at least two interlocutors; a processing device in operational communication with the recording device and being configured for segmenting each of the first and second voice recordings into respective shorter time interval segments thereby providing respective first and second sets of voice recording segments, mixing the first and second sets of voice recording segments together in a randomly rearranged order, and splicing the mixed sets of voice recording segments into a single randomly mixed voice recording; and a speaker device in operational communication with the processing device for emitting the randomly mixed voice recording, wherein emitting the randomly mixed voice recording during the conversation of the at least two interlocutors prevents the intelligible recording of the conversation.

In accordance with an aspect of the present disclosure, there is provided a kit for preventing the intelligible recording of a voice, the kit comprising: a microphone device; a recording device for operatively communicating with the microphone device for recording the voice of a subject via the microphone device for a respective given time interval thereby providing a voice recording; an interface for prompting the subject to record their voice; a processing device for operatively communicating with the recording device and with the interface and being configured for segmenting the voice recording into shorter time interval segments thereby providing a set of voice recording segments, mixing the first and second sets of voice recording segments together in a randomly rearranged order, and splicing the mixed sets of voice recording segments into a single randomly mixed voice recording; and a speaker device for operatively communicating with the processing device for emitting the randomly mixed voice recording, wherein emitting the randomly mixed voice recording during the subject's speaking prevents the intelligible recording of the subject's voice.

In accordance with an aspect of the present disclosure, there is provided a kit for preventing the intelligible recording of a conversation between at least two interlocutors, the kit comprising: a microphone device; a recording device for operatively communicating with the microphone device for separately recording each of the voices of the at least two interlocutors via the microphone device for a respective given time interval thereby providing a first voice recording for one of the at least two interlocutors and a second voice recording for the other of the at least two interlocutors; an interface for prompting each of the at least two interlocutors of recording their voices; a processing device for operatively communicating with the recording device and with the interface and being configured for segmenting each of the first and second voice recordings into respective shorter time interval segments thereby providing respective first and second sets of voice recording segments, mixing the first and second sets of voice recording segments together in a randomly rearranged order, and splicing the mixed sets of voice recording segments into a single randomly mixed voice recording; and a speaker device for operatively communicating with the processing device for emitting the randomly mixed voice recording at an audible level, wherein playing the randomly mixed voice recording level during the conversation of the at least two interlocutors prevents the intelligible recording of the conversation.

In an embodiment, the randomly mixed voice recording is emitted at an audible level. In an embodiment, the randomly mixed voice recording is emitted at an inaudible level. In an embodiment, the randomly mixed voice recording is emitted at both an audible level and an inaudible level. In an embodiment, the inaudible level is selected from the group consisting of an infrasound and an ultrasound.

In an embodiment, preventing the intelligible recording of the subject's voice comprises emitting the randomly mixed voice recording during the real-time audio recording of the subject's causing the real-time audio recording of the randomly mixed voice recording thereby masking the audio recording of the subject's voice.

In an embodiment, preventing the intelligible recording of the conversation comprises emitting the randomly mixed voice recording during the real-time audio recording of the conversation causing the real-time audio recording of the randomly mixed voice recording thereby masking the conversation.

In an embodiment, the steps provided herein are computer implementable and the processor comprises a memory of the computer implementable steps.

In an embodiment, the speaker comprises a tweeter. In an embodiment, the devices and kits herein further comprise a plurality of the microphones. In an embodiment, the devices and kits herein further comprise a plurality of the speakers.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 1 is a schematic representation of a device for preventing intelligible voice recordings in accordance with a non-limiting illustrative embodiment of the present disclosure;

FIG. 2 is a schematic representation of a first voice recording for a given time interval of the voice of one subject or interlocutor in accordance with a non-limiting illustrative embodiment of the present disclosure;

FIG. 3 is a schematic representation of a second voice recording for a given time interval of the voice of another subject or interlocutor 1 in accordance with a non-limiting illustrative embodiment of the present disclosure;

FIG. 4 is a schematic representation of the first voice recording of FIG. 2 having been segmented so as to provide a first set of voice recording segments in accordance with a non-limiting illustrative embodiment of the present disclosure;

FIG. 5 is a schematic representation of the second voice recording of FIG. 3 having been segmented so as to provide a second set of voice recording segments in accordance with a non-limiting illustrative embodiment of the present disclosure; and FIG. 6 is a schematic representation of the first set of voice recording segments of FIG. 4 and of the second set of voice segments of FIG. 5 having been randomly mixed together and spliced so as to provide a randomly mixed voice recording in accordance with a non-limiting illustrative embodiment of the present disclosure;

FIG. 7 is a schematic representation of the set of voice recording segments of FIG. 4 having been mixed in a randomly rearranged order in accordance with a non-limiting illustrative embodiment of the present disclosure;

FIG. 8 is a schematic representation of the randomly mixed voice segments of FIG. 7 having been spliced so as to provide a randomly mixed voice recording in accordance with a non-limiting illustrative embodiment of the present disclosure; and FIG. 9 is a schematic representation of a method of preventing intelligible voice recordings in accordance with a non-limiting illustrative embodiment of the present disclosure.

DETAILED DESCRIPTION OF ILLUSTRATIVE EMBODIMENTS

Generally stated and in accordance with an embodiment, there are provided methods, devices, systems and kits for preventing the intelligible voice recording is provided. The voice of a subject or interlocutor is recorded for a given time interval thereby providing a voice recording. The voice recording is cut into shorter time interval segments thereby providing a set of voice recording segments. The set of voice recording segments is mixed in a randomly rearranged order. The mixed set of voice recording segments is spliced into a single randomly mixed voice recording. Emitting the randomly mixed voice recording during speaking of the subject or interlocutor prevents the intelligible recording of the voice of the subject or interlocutor With reference, to the appended Figures, non-restrictive illustrative embodiments will be herein described so as to further exemplify the disclosure only and by no means limit the scope thereof.

FIG. 1 shows an arrangement for preventing intelligible voice recordings also known as a voice recording jammer 10. The jammer 10 is shown here in the form of a device. Of course, the arrangement of FIG. 1 can also be a kit or a system. Device 10 prevents the intelligible recording of a voice. In an embodiment, device 10 prevents the intelligible recording of a conversation between at least two interlocutors.

The device 10 includes at least one microphone 12 which is in operational communication with a processor 14 and at least one speaker 16 also in operational communication with the processor 16. It is understood herein, that operational communication includes without limitation wire or wireless connection, or integrated connection as is known in the art. As such the device 10 may be a single unit with integrated microphone 12, processor 14 and speaker 16 or include separate microphone 12, processor 14 and/or speaker 16. The skilled artisan will appreciate that various configurations can be contemplated for providing operational communication between one or more microphones 12, a processor 16 and one or more speakers 16.

The processor 14 includes a recorder 18 for recording the voices of the interlocutors via the microphone 12 as will be discussed herein. The recorder 18 is an integral element of the processor 14. Of course, the recorder 18 may also be a separate element in operational communication with the processor 14. The processor 14 includes a memory 20 of computer implementable steps for modifying the voice recordings as will be discussed herein. The memory 20 is an integral element of the processor 14. Of course, the memory 20 can also be a separate element which is in operational communication with the processor 14 (e.g. chip, USB etc.).

The speaker 16 provides for emitting the modified recording during speaking such as when one person is speaking or during the conversation between the interlocutors as will be discussed herein.

The speaker 16 can be provided in a variety of configurations as is known in the art. In one example, the speaker 16 is a tweeter.

In an embodiment, the sound emitted by the speaker 16 is audible. In an embodiment, the sound emitted by the speaker 16 is inaudible such as infrasound or ultrasound. In an embodiment, the speaker 16 emits both audible and inaudible sound. In an embodiment, the device 10 includes at least two speakers 16 or a plurality of speakers 16 which selectively and/or respectively emit one of or both audible and inaudible sound.

The skilled artisan will easily appreciate that the type of speaker, the number of speakers, the position of the speaker or speakers and the type of sound emission (i.e. audible or inaudible) is a function of the distance of voice recording suppression, the horizontal and vertical beam widths of this suppression and the type of audio surveillance recording device that is being used. It is understood that audio surveillance recording devices include any type covert listening device known in the art utilizing a variety of microphones. These devices include without limitation bugs, wires, smartphones and the like as can be contemplated by the skilled artisan.

The device 10 may also include an interface 22 in operational communication with the processor 14 for providing the users to operate the device 10. For example, the interface 22 may be in the form of a control panel, a touch screen, a voice operated input/output and the like as is known in the art. The interface 22 may communicate a set of instructions to the user or may variously prompt one speaker to record their voice or the at least two interlocutors to record their individual voices as discussed herein by providing them with a set of questions or a text. These instructions are contained within the memory 20 of the processor 14. The interface 22 may be a separate component or integrated to the device 10 or to one of more of the other components thereof as will be contemplated by the skilled artisan.

In another example, FIG. 1 represents a kit, with several of the components 12, 14, 16, 18, 20 or 22 being separate devices to be placed in operational communication with another device as discussed herein.

In one non-limiting example, the device 10 is remotely operated.

With reference to the non-limiting illustrative embodiments of FIGS. 2 to 6, the operation of the device 10 and of the method, kit and system preventing the intelligible recording of a conversation between at least two interlocutors will now be discussed.

Each interlocutor records their voice separately. In on example, the interface 22 may prompt each interlocutor to read a statement or answer questions into one or more microphones 12 which transmit the sound wave to the processor 14 for recording. In this way, two recordings are provided: the first voice recording 24 (see FIG. 2) of one of the interlocutors and the second voice recording 26 (see FIG. 3) of the other of the two interlocutors. Of course, a greater number of interlocutors may participate in the conversation. As such, each participating interlocutor will record their voice separately to provide a respective voice recording. The first and second the voice recordings 24 and 26, respectively, have a given time interval, frame or length. It should be understood that the terms "first" and "second" are used herein for convenience in order to descriptively differentiate between the two voice-recordings and by no means impose an order or a hierarchy. Of course, all voice recordings can be generated at the same. The foregoing is more convenient with multiple microphones 12.

FIGS. 4 and 5 show that each of the first 24 and second 26 voice recordings have been segmented by processor 14. Specifically, the first voice recording 24 is segmented into a first set of separate voice recording segments 28, each segment 28 having a shorter time interval than the first voice recording 24. Similarly, the second voice recording 26 has been segmented into a second set of separate voice recording segments 30, each segment 30 having a shorter time interval than the second voice recording 26. The first set of voice recording segments 28 includes five segments A, B, C, D and E; similarly, the second set of voice recording segments 30 includes five segments i, ii, iii, iv and v. Segments A, B, C, D and E may be of equal, similar or different time intervals. Similarly, segments i, ii, iii, iv and v may be of equal, similar or different time intervals. Moreover, the first set of segments 28 and the second set of segments 30 may be of equal, similar or different time intervals relative to each other. Each voice recording 24 and 26 does not need to be segmented in the same number of segments. The example here shows five segments 28 for voice recording 24 and five segments 30 for voice recording 26 for the purposes of convenience only. A greater or lesser number of segments can be contemplated by the skilled artisan, segmentation will be based on convenient time intervals. A given recording 24 may be segmented into more or less segments 28 than a given recording 26. The number of segments, the time interval of each segment and the variations thereof are predetermined by the computer implementable steps of the memory 20.

Turning now to FIG. 6, the segments 28 and 30 are mixed together in a random rearranged order. Once again, the predetermined parameters in the memory 20 provides for various random mixes. In the non-limiting illustrative example, shown here, a given segment 28 (A, B, C, D or E) is preceded by a given segment 30 (i, ii, iii, iv, and v). Of course, other options are possible when two segments of one set are preceded by one segment of another set followed by three segments the latter set and so on and so forth. Various configurations of this mixture of rearranged random order can be provided. However, it is shown in this example that the order of the voice recording is rearranged so as to be turned into gibberish. Segmentation can be done at a variety of equal or unequal time intervals as discussed above. Furthermore, the segments 28 or 30 can be backmasked so as to be inverted i.e. the natural beginning of the segment becomes the end and the natural end, the beginning, in essence the segment is configured to be emitted backwards. Furthermore, the example of FIG. 6 shows that the segments are interwoven to provide five similar time intervals (D/ii), (A/iv), (C/i), (E/iii) and (B/v) with an equal mix of segment 28 and segment 30. As such, providing an equal interwoven mix of the respective rearranged gibberish of each of the voices of the interlocutors. The skilled artisan can contemplate other convenient mixtures and balances between the two or more interlocutors and these parameters can be provided within the memory 22.

Once the predetermined mixture of the randomly rearranged order of segments has been accomplished, the segments are spliced together to form a single randomly mixed voice recording 32 shown in FIG. 6.

The devices, methods, systems and kits herein can continue to follow the above steps so as to provide still other single randomly mixed voice recordings that are differently configured than the spliced recording 32. These single randomly mixed recordings can then be spliced together in order to provide a longer single randomly mixed voice recording. Indeed, the single randomly mixed recordings can be further be segmented, mixed together and then spliced. Furthermore, a variety of single randomly mixed voice recording types as provided herein can be layered one on top of the other. This layering process may include offsetting the segments in such a way as for a given segment 28 to be layered with a given segment 30 rather than another given segment 28.

Once the predetermined spliced single mixed voice recording is provided in accordance with the predetermined parameters of the memory 20, the processor 14 can then transmit this resulting spliced recording to the speaker 16 so that it is emitted The interlocutors can then proceed with their conversation as the speaker emits the resulting spliced recording at an audible level, an inaudible level or a mixture thereby preventing the intelligible recording of the conversation by an audio surveillance recorder as is known in the art.

In an example there are two interlocutors having a conversation, X and Y. If someone has placed an audio surveillance recorder to pick up the conversation of the interlocutors X and Y, the above discussed resulting spliced recording gibberish will be mixed with voices of X and Y during their conversation. The resulting spliced recording described herein contains the voices of both X and Y in mixed gibberish. As the mixed gibberish is emitted at an audible and/or unaudible level during the conversation of X and Y the audio surveillance recorder will record the sound in the room of the conversation including the gibberish masking the voices of X and Y. Since, the resulting spliced recording is a mixture of randomly rearranged recorded segments of the voice of X and Y, a gibberish segment of X will mix with and mask a real-time conversation segment of X and a gibberish segment of Y will mix with mask with a real time conversation segment of Y. The foregoing prevents the intelligible recording of the conversation. Moreover, if this unintelligible surveillance recording is analyzed in order to peel the gibberish masking from the conversation, it will be difficult to distinguish between a layer of a gibberish segment of X's voice on a layer of a voice portion of X's actual real conversation and the same applies for Y, mutatis mutandis. As such, the audio surveillance recording is jammed.

In another embodiment, the present disclosure provides for preventing the intelligible recording of the voice of a subject. As such, and with reference to the non-limiting illustrative embodiments of FIGS. 2, 4, 7 and 8, the operation of the device 10 and of the method, kit and system preventing the intelligible recording of a voice will now be discussed.

The subject records their voice via one or more microphones 12 which transmit the sound wave to the processor 14 for recording thereby providing a voice recording 24 having a given time length.

Turning now to FIG. 4, the voice recording 24 is segmented into a set of separate voice recording segments 28, namely A, B, C, D, E as previously explained.

As shown in FIG. 7, the set of voice segments 28 is randomly mixed and spliced together to provide a single randomly mixed voice recording 34 as shown in FIG. 8. Mixing and splicing is provided herein as previously described including and without limitation to further segmentation, mixing and splicing of the recording 24 to provide still other single randomly mixed voice recordings or further segmentation, mixing and splicing of the recording 34 to provide still other single randomly mixed voice recordings, or layering of various modified recordings such as recording 34 as previously discussed, including selectively backmasking certain segments 28 in order to provide still other single randomly mixed voice recordings within the context of the present disclosure.

Once the predetermined spliced single mixed voice recording is provided in accordance with the predetermined parameters of the memory 20, the processor 14 can then transmit this resulting spliced recording to the speaker 16 so that it is emitted The subject can then proceed to speak as the speaker emits the resulting spliced recording at an audible level, an inaudible level or a mixture thereby preventing the intelligible recording of the subject's voice by a covert audio recorder as is known in the art.

The resulting spliced mixed recoding 34 contains the voice of the subject in mixed gibberish. As the mixed gibberish is emitted during the subject's speaking the audio surveillance recorder will record both the sound of the subject's voice in tandem with the gibberish thereby masking the subject's voice. The foregoing prevents the intelligible recording of the subject's voice. Moreover, if this unintelligible surveillance recording is analyzed in order to peel the gibberish masking from the voice recording of the subject, it will be difficult to distinguish between a layer of a gibberish segment and a layer of an intelligible voice portion of the subject's actual speech.

Turning now to FIG. 9, there is shown the steps of the method 100 of preventing intelligible voice recordings in accordance with a non-limiting illustrative embodiment of the present invention. The initial step 102 is to record a voice 102, the next step 104 is to segment the voice recording, followed by the step 106 of mixing the segments of the voice recording, in the subsequent step 108, the mixed voice segments are spliced providing a modified recording that is a single and continuous recording of spliced mixed voice segments. The last step 110 is to emit the modified recording during speech so as to prevent the intelligible recording of the speech giver's voice by an audio recorder as previously explained.

The skilled artisan will appreciate the present device, method, kit and system can be used in combination with one or more other audio jamming techniques, devices, kits, systems and methods.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A device for preventing the intelligible recording the intelligible recording of a voice, the device comprising:

at least one microphone;

a processor in operational communication with the microphone, the processor comprising a memory of stored computer implementable steps and being configured for implementing the stored computer implementable steps of:

recording the voice of a subject via the microphone for a given time interval thereby providing a voice recording;

segmenting the voice recording into shorter time interval segments thereby providing a set of voice recording segments;

mixing the order of the voice recording segments of the set in a randomly rearranged order; and splicing the mixed set of voice recording segments into a single randomly mixed voice recording; and at least one speaker in operational communication with the processor for emitting the randomly mixed voice recording, wherein emitting the randomly mixed voice recording during the subject's speaking prevents the intelligible recording of the subject's voice, wherein preventing the intelligible recording of the subject's voice comprises emitting the randomly mixed voice recording during the real-time audio recording of the subject's causing the real-time audio recording of the randomly mixed voice recording thereby masking the audio recording of the subject's voice.

2. A device according to claim 1, wherein the randomly mixed voice recording is emitted at a level selected from the group consisting of an audible level, an inaudible level and a combination thereof.

3. A device according to claim 2, wherein the inaudible level is selected from the group consisting of an infrasound and an ultrasound.

4. A device for preventing the intelligible recording of a conversation between at least two interlocutors, the device comprising:

at least one microphone;

a processor in operational communication with the microphone, the processor comprising a memory of stored computer implementable steps and being configured for implementing the stored computer implementable steps of:

separately recording each of the voices of the at least two interlocutors via the microphone for a respective given time interval thereby providing a first voice recording for one of the at least two interlocutors and a second voice recording for the other of the at least two interlocutors;

segmenting each of the first and second voice recordings into respective shorter time interval segments thereby providing respective first and second sets of voice recording segments;

mixing the first and second sets of voice recording segments together in a randomly rearranged order; and splicing the mixed sets of voice recording segments into a single randomly mixed voice recording; and at least one speaker in operational communication with the processor for emitting the randomly mixed voice recording, wherein emitting the randomly mixed voice recording during the conversation of the at least two interlocutors prevents the intelligible recording of the conversation, wherein preventing the intelligible recording of the conversation comprises emitting the randomly mixed voice recording during the real-time audio recording of the conversation causing the real-time audio recording of the randomly mixed voice recording thereby masking the conversation.

5. A device according to claim 4, wherein the randomly mixed voice recording is emitted at a level selected from the group consisting of an audible level, an inaudible level and a combination thereof.

6. A device according to claim 5, wherein the inaudible level is selected from the group consisting of an infrasound and an ultrasound.

7. A device according to claim 1, further comprising at least one recorder in operational communication with the at least one microphone and with the processor for recording the voice of a subject via the at least one microphone for a given time interval thereby providing the voice recording.

8. A device according to claim 4, further comprising at least one recorder in operational communication with the at least one microphone and with the processor for separately recording each of the voices of the at least two interlocutors via the at least one microphone for a respective given time interval thereby providing the first voice recording for one of the at least two interlocutors and the second voice recording for the other of the at least two interlocutors.

* * * * *